US007554522B2

(12) United States Patent
Sinclair, II et al.

(10) Patent No.: US 7,554,522 B2
(45) Date of Patent: Jun. 30, 2009

(54) PERSONALIZATION OF USER ACCESSIBILITY OPTIONS

(75) Inventors: Robert E. Sinclair, II, Sammamish, WA (US); Gilma Annuska Perkins, Redmond, WA (US); Michael Edward Dulac Winser, Westport, CT (US); Ramkumar Subramanian, Kirkland, WA (US); Paul Reid, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 658 days.

(21) Appl. No.: 11/021,415

(22) Filed: Dec. 23, 2004

(65) Prior Publication Data
US 2006/0139312 A1    Jun. 29, 2006

(51) Int. Cl.
*G06F 3/00* (2006.01)

(52) U.S. Cl. .................. 345/156; 715/747; 715/865; 715/866; 706/11

(58) Field of Classification Search .......... 715/865, 715/866, 744, 747; 706/11; 345/156
See application file for complete search history.

(56) References Cited

U.S. PATENT DOCUMENTS

| | | | | |
|---|---|---|---|---|
| 5,814,798 | A  * | 9/1998 | Zancho .................. | 235/380 |
| 6,161,176 | A  * | 12/2000 | Hunter et al. ............. | 713/1 |
| 6,963,937 | B1 * | 11/2005 | Kamper et al. ............ | 710/73 |
| 6,966,034 | B2 * | 11/2005 | Narin .................... | 715/744 |
| 7,062,547 | B2 * | 6/2006 | Brown et al. ............. | 709/221 |
| 7,107,539 | B2 * | 9/2006 | Abbott et al. ............ | 715/744 |
| 2002/0118223 | A1 | 8/2002 | Steichen et al. | |
| 2003/0046401 | A1 * | 3/2003 | Abbott et al. ............ | 709/228 |
| 2003/0061317 | A1 * | 3/2003 | Brown et al. ............. | 709/221 |

OTHER PUBLICATIONS

"User Agent Accessibility Guidelines 1.0", Oct. 16, 2002, Jacobs et al. editor, 19 pages, downloaded from web.archive.org by R. Rainey on Apr. 25, 2009; original available at http://web.archive.org/web/20021215215923/www.w3.org/TR/WAI-USERAGENT.*
"Accessibility Launch," Question and Answer Document, IBM Accessibility Center, pp. 1-15, Mar. 2003.
CE Software, Inc., QuicKeys X2, Features & Benefits, pp. 1-6, http://www.quickeys.com/products/qkx-fb.html, visited Mar. 12, 2004.
AT Journal, "The newest AT goes mainstream and to the movies" vol. 70, pp. 1-4, Apr. 1, 2003, http://www.atnet.org/news/2003/apr03/040102.htm, visited Mar. 12, 2004.
IBM Research, "Keyboard Optimizer," pp. 1-3, http://www.research.ibm.com/KeyboardOptimizer/, visited Mar. 12, 2004.
Screenshots of MS Accessibility Wizard, pp. 1-4, visited Jul. 27, 2004.

* cited by examiner

*Primary Examiner*—Amare Mengistu
*Assistant Examiner*—Robert R Rainey
(74) *Attorney, Agent, or Firm*—Klarquist Sparkman, LLP

(57) ABSTRACT

A computing environment can dynamically respond to user preferences and personal abilities by enabling computer users to configure their computing experience by implicitly gathering information about the users' needs. The system can detect users' issues during the natural course of interaction with the system and offer to make adjustments to make their tasks simpler and more enjoyable. The system can allow for the configuration of settings that can impact users' abilities to receive important information from the system or provide input to the system.

17 Claims, 5 Drawing Sheets

PERSONALIZATION OF USER ACCESSIBILITY OPTIONS

TECHNICAL FIELD

The technical field relates to computer hardware and software, more specifically personalizing user accessibility options.

BACKGROUND

There are a number of challenges facing users with disabilities that prevent them from fully experiencing the power of the personal computer (PC) and other devices. One significant contributor is the requirement that users adapt their working style, modes of communication, and thought processes to suit the device or software they are using. The aging population faces challenges similar to those faced by users with disabilities, such as difficulty seeing the display, hearing the audio, using the mouse, and configuring their system. Also, they often fail to discover features designed to help them. Aging users rarely identify themselves as being disabled. Therefore, it is important that system capabilities are not marked solely as features for users with disabilities.

Current design issues include: assumptions regarding input (e.g., the mouse and keyboard are the only devices widely supported); assumptions regarding output (e.g., many users cannot use "standard" forms of output, such as monitor and speakers); and cumbersome user interfaces (UIs) (e.g., graphical user interfaces (GUIs) require a user to wade through multiple levels of the UI to accomplish a single task, and the keyboard navigation model is often highly complex and not easily discovered).

Current general usability issues include: user preferences being ignored (e.g., users are prevented from adjusting their systems to meet their needs because system colors, fonts, sizes, and timing are not consistently respected); local settings (e.g., user settings are stored locally and are therefore not available on other devices, thereby placing the burden of configuration on the user); setup and configuration (e.g., configuring devices is too difficult for many users, especially seniors and users with disabilities); and hardware that is unaware (e.g., users must manually adjust their systems to compensate for changes in their surroundings such as lighting and background noise).

Current issues regarding programmatic access to information include: incomplete UI information (e.g., only a small subset of UI information can be retrieved by assistive technology (AT) products, which rely on hooks, application-specific APIs, and unsupported techniques to collect necessary information); poor magnification support (e.g., current techniques produce low-quality images); loss of information (e.g., information conveyed by layout alone, such as visual grouping or alignment of controls, can not be discovered programmatically and conveyed in another form such as Braille or speech); and inadequate automation support (e.g., user input cannot be simulated by alt input devices).

While users with disabilities as well as the aging population are likely to have the most extreme demands, there are many other users that would benefit from improvements in accessibility options because of the various factors that can produce temporary or situational disabilities. For example, the use of a display in bright sunlight is comparable to complete or partial blindness, working in an environment with high levels of background noise is comparable to being deaf, the use of a device by a user whose hands are injured or occupied is comparable to the user having a mobility impairment, and eye strain (e.g., a need for magnification and/or change in contrast) is comparable to low vision. Additionally, Repetitive Stress Injury (RSI) is comparable to a mobility impairment.

Thus, there still exists a need for improving user accessibility options technology.

SUMMARY

The disclosed technology provides systems and methods that can enable computer users to configure their computing experience by implicitly gathering information about the users' input and output needs. System settings can thus be modified for users without any knowledge of industry jargon and without the need to know the names of system settings to be changed. For example, many users with limited dexterity in their hands have difficulty pressing multiple key combinations and would not be aware of a Microsoft Windows feature called "Sticky Keys" that can help them avoid this problem. Using the disclosed technology, the system can automatically detect these types of problems during the users' natural course of interaction with the system and offer to make adjustments to make their tasks such as typing on the keyboard simpler and more enjoyable.

This computing environment can be dynamic enough to respond to user preferences and personal abilities. It embodies the principles of usability by presenting easily discoverable features for configuring the system's settings and ensuring the system is usable by all persons, including those with disabilities. The disclosed technology is designed to allow for the configuration of settings that can impact users' ability to receive important information from the system or provide input to the system.

DETAILED DESCRIPTION

Overview

In the following description of the disclosed technology, reference is made to the accompanying drawings which form a part hereof, and in which is shown by way of illustration specific embodiments in which the invention may be practiced. Other embodiments may be utilized and structural changes may be made without departing from the scope of the disclosed technology.

Example 1

A First Exemplary System for Personalizing User Accessibility Options

Figure 1:
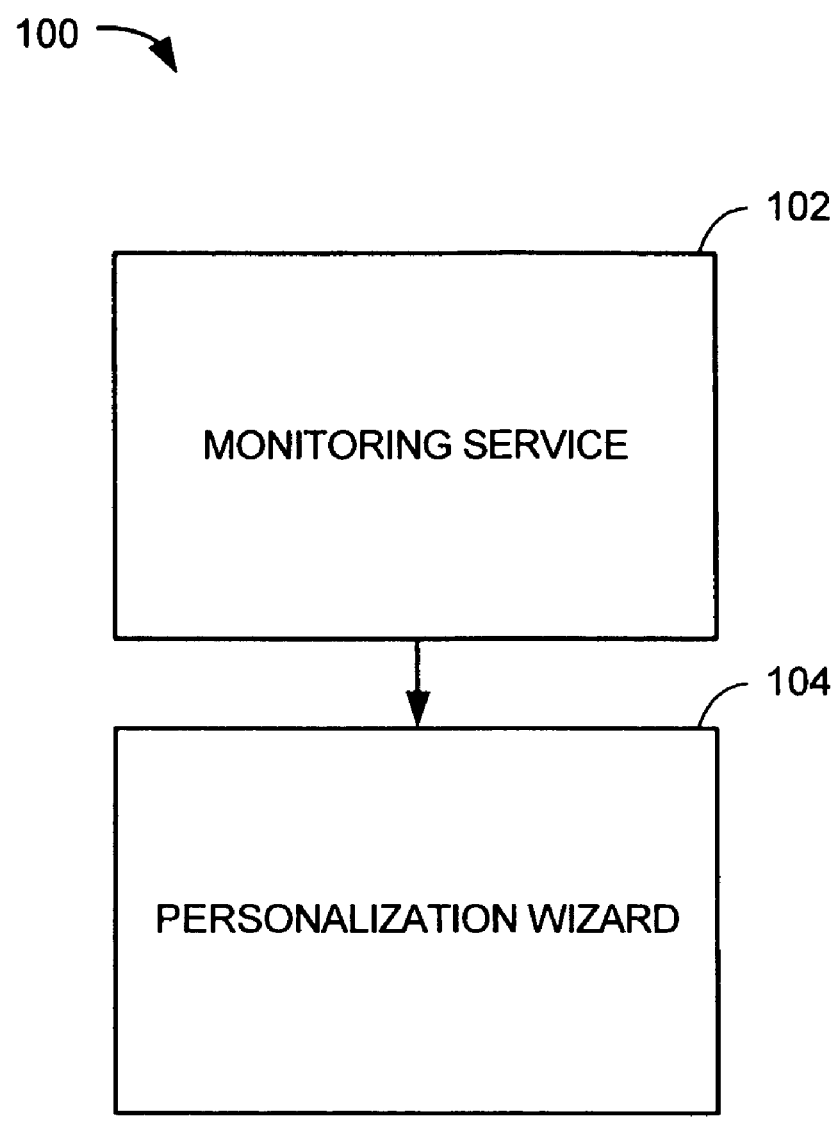
FIG. 1 is a block diagram showing an exemplary system for personalizing user accessibility options.

FIG. 1 is a block diagram representing an exemplary system 100 for personalizing user accessibility options. In the example, the system includes a monitoring service 102 that monitors and tracks a computer user during the user's interaction with the system. The monitoring service 102 can analyze and store information based on the user's interaction with the system in a user profile (e.g., a file).

The system also includes a Personalization Wizard 104 that can suggest or make certain changes to accessibility options within the system based on the user's interaction with the system. Suggestions presented to the user by the Personalization Wizard 104 may be specific (e.g., identify specific accessibility options that can be changed) or general (e.g., provide the user with general help information regarding a certain category of accessibility options such as visual settings).

Example 2

A Second Exemplary System for Personalizing User Accessibility Options

Figure 2:
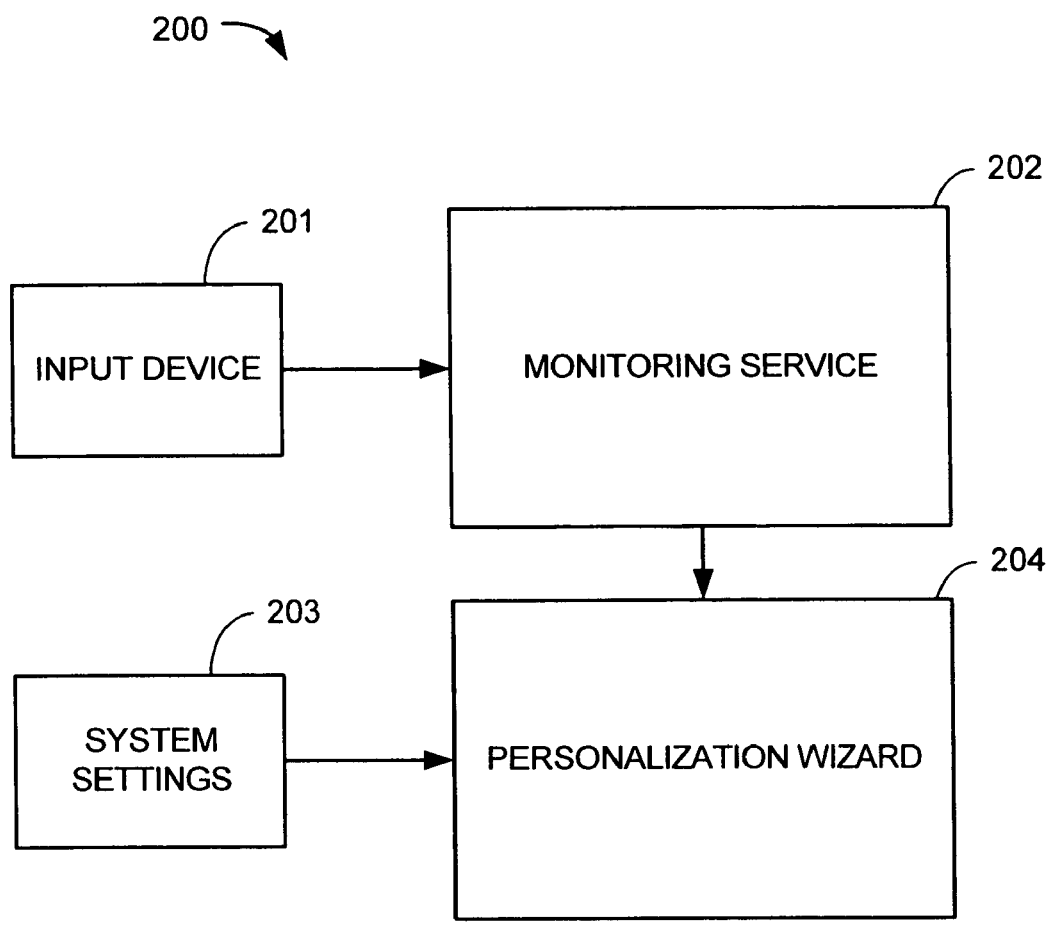
FIG. 2 is a block diagram showing another exemplary system for personalizing user accessibility options.

FIG. 2 is a block diagram representing another exemplary system 200 for personalizing user accessibility options. In the example, the system includes a monitoring service 202 that monitors and tracks a computer user during the user's interaction with the system. The system also includes an input device 201 (e.g., a keyboard or a mouse) that can provide input to the monitoring service 202.

The system further includes a Personalization Wizard 204 that can suggest or make certain changes to accessibility options within the system based on the user's interaction with the system. System settings 203 (e.g., accessibility settings) can be used to control behavior of the computer system being used by the user.

Example 3

Exemplary Method for Personalizing User Accessibility Options

Figure 3:
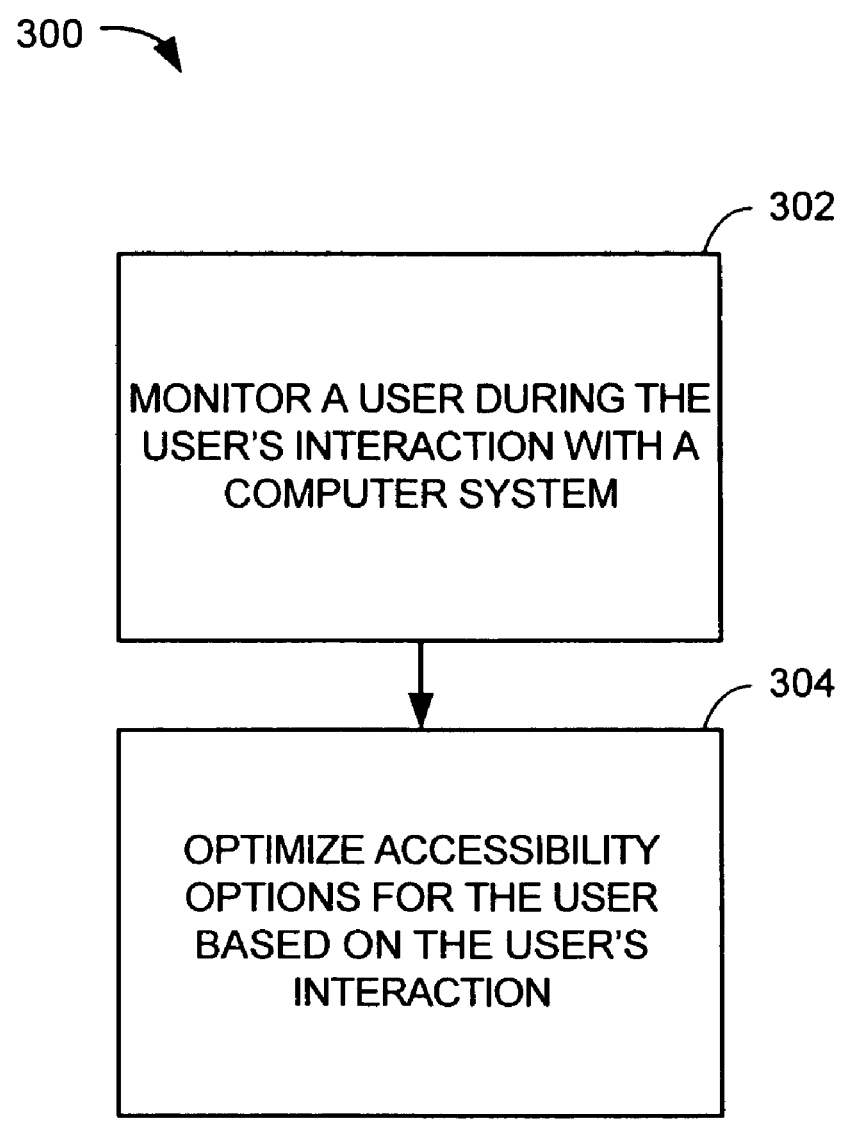
FIG. 3 is a flowchart showing an exemplary method for personalizing user accessibility options, such as with the system shown in FIG. 1.

FIG. 3 is a flowchart showing an exemplary method 300 for personalizing user accessibility options, such as with the system shown in FIG. 1. The methods of any of the examples described herein can be performed in software executing computer-executable instructions. Such instructions can be stored in one or more computer-readable media.

At 302, a user's interaction with a computer system is monitored (e.g., by a monitoring system). A user profile may be created to store information regarding the user's interaction with the computer system. For example, if the user had difficulty performing double-click operations with the mouse, then such information might be tracked (e.g., stored in the user profile).

At 304, the user's accessibility options are optimized based on the user's interaction. As part of this step, the user profile may be consulted by a tool (e.g., a Personalization Wizard) to determine what changes should be suggested or made. For example, if the user had difficulty performing double-click operations with the mouse, then the tool might modify the double-click speed in the mouse settings or suggest such a modification. Such a modification can tell the system to recognize two slower clicks as a single double-click. Modifications can be made with or without user approval, as desired.

Accessibility settings can be used to configure any of the assistive technologies described herein.

Example 4

Exemplary Accessibility Inferences

In any of the examples described herein, monitoring a user's interaction with a computer system can be used to infer accessibility information (e.g., for any of the assistive technologies described herein) about the user. Based on the accessibility information, the system can then make an appropriate configuration change to address the related accessibility issue or present the option to do so.

Example 5

Exemplary User Difficulty with Mouse

In any of the examples described herein, if a user uses a mouse in a particular way that indicates difficulty mousing, the system can infer that the user has difficulty performing operations with the mouse. For example, consider a user that wants to open a file by double-clicking on the file icon but can't make both clicks within the allotted time for a double-click operation. Rather than opening the file, the clicks might do something else instead (e.g., make the title of the file editable, or select-de-select the icon). If the user repeats this behavior a certain number of times (e.g., two) or within a certain time period (e.g., ten seconds), or both, the system can infer that the user has difficulty double-clicking. Accessibility settings can then be configured accordingly. For example, the time between clicks for a double-click operation can be lengthened to allow for greater intervals of time between clicks, or, the option to do so can be presented.

Example 6

Exemplary User Difficulty with Typing

In any of the examples described herein, the system can infer that a user has difficulty typing based on certain user behavior. In one situation, a user might repeatedly press a key (e.g., multiple times) or hold a key for more than a certain threshold of time (e.g., one second) (e.g., resulting in multiple identical letters, some of which are subsequently deleted). Alternatively or additionally, the user might accidentally press more keys than are needed for whatever operation the user is attempting to do (e.g., typing extra characters and subsequently deleting them). In such situations, the system can infer that the user might need an assistive aid to help him or her type. The system can then configure some settings (e.g., change typing settings to allow for the ignoring of certain brief or repeated keystrokes, or to increase the time after which multiple identical letters are produced) to match the needs of the user, or present the option to do so. In some embodiments, the system automatically provides this service to the user.

Example 7

Exemplary User Difficulty with Viewing the Screen

In any of the examples described herein, the system can infer that a user has difficulty viewing the screen. For example, if a user selects larger fonts in multiple applications or documents, or if the user performs a certain combination of actions (e.g., selecting a larger font and using some type of magnification mechanism in the same document/application or another), the system can provide for the appropriate configuration of accessibility settings (e.g., automatically increase font and/or view magnification), or present the option to do so.

Example 8

Exemplary User Profile

Figure 4:
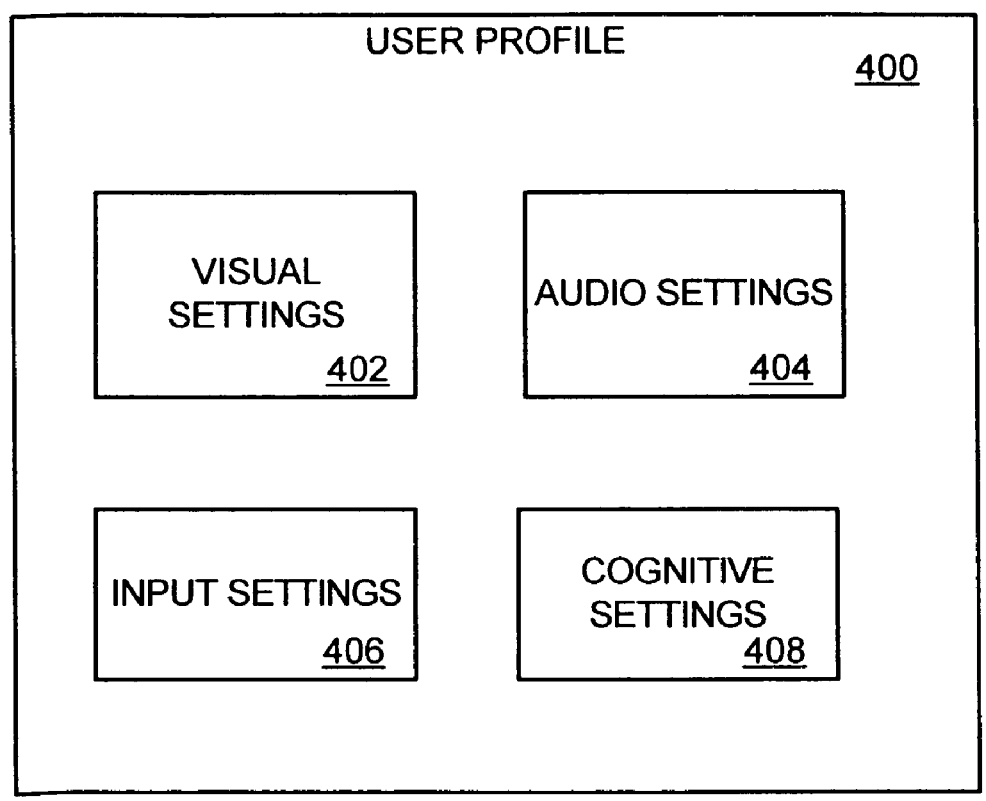
FIG. 4 is a block diagram showing a data structure representing a user profile.

FIG. 4 is a block diagram showing a data structure representing a user profile 400. The user profile 400 can contain a great deal of information, both specific and general. For example, the user profile 400 may contain information regarding a user's visual settings 402 or audio settings 404. The user profile 400 may also contain information regarding the user's input settings 406 or cognitive settings 408. The user profile 400 may contain any of a number of combinations of information regarding the areas listed above and areas not listed. The user profile 400 of FIG. 4 is only one example and should not be construed as limiting with regard to what information is stored within a profile.

Example 9

Exemplary Adaptive Computing Environment (ACE)

In the example, an Adaptive Computing Environment (ACE) can redefine how users interact with their devices by giving them greater control over input and output modalities, the behavior of their device in changing environmental conditions, and the look and feel of their computing experience. Because this environment embodies the principles of accessibility, it can provide an ideal solution for people with disabilities. Such an ACE can unleash the power of the user and set a new accessibility and usability bar for the computer industry.

In the example, an ACE includes a computing environment that intelligently optimizes itself for its user, the device, and its surroundings. For example, an individual who is blind can choose synthesized speech or Braille as their primary form of output, and a person who is deaf can see closed captions or descriptive text in place of audio output. Additionally, individuals with light-sensitive epilepsy can turn off animations or adjust their speed to prevent seizures, and a portion or all of the display can be magnified to improve usability and readability for aging consumers. Also, users with low vision or color blindness can adjust colors, sizes, and fonts, and handheld devices can detect glare on the display and, in response, increase contrast or switch to synthesized speech output.

Example 10

Exemplary Personalization Wizard

In the example, a Personalization Wizard embodies the principles of usability by presenting easily discoverable features for configuring the system's settings and ensuring that the system is usable by as many users as possible, including those with disabilities. The Personalization Wizard can allow users to step through each of several settings one by one or to jump directly to specific categories of settings if they know exactly what they want to set. Users can use the Personalization Wizard to customize system-wide settings that are related to accessibility, customize and launch accessibility aids (e.g., Narrator, On-Screen Keyboard, and Magnifier), and customize and launch third-party accessibility aids. As the users make changes in the wizard, those changes will be automatically applied so that the users can benefit from the changes and be allowed to immediately understand the impact of their changes. However, any change performed by the Personalization Wizard can be immediately undone by means such as pressing the Backspace key on the keyboard or by right clicking with the mouse. This can allow users to modify a setting that did not have the desired impact on their user experience. While most, or all, of these settings might be available through Control Panels elsewhere in the system, the Personalization Wizard can pull all of the settings relevant for input or output together into one convenient location.

In the example, the Personalization Wizard can allow the user to customize visual settings as follows:
Screen resolution
Colors
Font face, size, weight, and stroke used to render text throughout the system
Appearance and thickness of the Focus Indicator
Appearance and size of Mouse Cursors
Animation settings (e.g., turn animation ON or OFF in specific UI situations)
Transparency in the UI (e.g., force it to be 100% opaque)
Size of clickable regions (e.g., icons, scrollbars, buttons, window borders)
Cursor width and blink rate
Magnification settings (e.g., when other size adjustments are insufficient)
Alarm notifications for critical events (e.g., low battery, network status changes)

In the example, the Personalization Wizard can allow the user to customize audio settings as follows:
Volume
Sound schemes
Text-to-Speech (TTS) settings (e.g., voice, speed, and pitch)
Provide captions for recorded audio (e.g., Show Sounds)
Provide text equivalents for audio notifications (e.g., Sound Sentry and PlaySound)

In the example, the Personalization Wizard can allow the user to customize input settings as follows:
Typing assistance (e.g., Sticky Keys, Bounce Keys, Toggle Keys, and key repeat rate)
Pointer assistance (e.g., Mouse Keys and Mouse settings such as buttons, speed, double click interval, mouse trails, and radar)
Input hints for interacting with the system (e.g., extra keyboard help)
Configurable timeout intervals for responding to prompts or questions
Allowing key combinations, such as Ctrl+Alt+Del, to be entered by the pressing of one key at a time
Support for custom input devices (e.g., game controllers to replace mouse, and single switch input)

In the example, the Personalization Wizard can allow the user to customize cognitive settings as follows:
Dynamic UI (e.g., auto-hiding toolbars, customizable menus, glomming, and grouping)
Complexity of UI (e.g., remove "Advanced" button from dialogs)

In the example, the Personalization Wizard can be fully accessible (e.g., adhere to all Microsoft accessibility guidelines and fully support Microsoft Windows UI Automation). It can also provide advanced UI support to ensure that all users can use it effectively (e.g., support text captioning, present self-voicing UI, offer full-screen magnification, and automatically detect and utilize a USB Braille device)

In the example, personal profiles (e.g., collections of preferences and settings) can be saved, restored, and edited to provide ease of transporting settings to another device and maintaining them over time.

In the example, the Personalization Wizard can be available at places where the users would want to customize their settings (e.g., during install, during setup, at first logon, on the default desktop immediately after first logon, and during subsequent logons and default desktops). The Personalization Wizard can be discoverable by all users (e.g., both mainstream and those with mild and severe disabilities). A user is generally not required to self-identify as having a disability.

In the example, the Personalization Wizard can be the one end-user tool for customizing accessibility-related settings and aids. The Personalization Wizard, along with redesign of built-in assistive technology aids, can better handle launching such aids versus customizing them. The Personalization Wizard itself can be fully accessible. Additionally, the Personalization Wizard can expose accessibility settings of the OS and, where possible, application accessibility settings. An end-user generally does not need to turn on a system setting and then turn on the same setting in an application. If the Personalization Wizard does not host the application setting, it can point the user to the correct place in the application to set it, launch the corresponding configuration UI, or provide Help text explaining these additional features. Users can also use the Personalization Wizard to find out about all accessibility-related features, including third-party AT products.

Example 11

Exemplary Personal Preferences and Device Capabilities that can Shape the Overall User Experience In the example, a system is designed to base all of its decisions off of the well-known settings contained in a user profile. Since this profile is generally available at all times, there is usually never a time when an application author needs to make assumptions about the user's working style, experience level, or hardware devices.

In the example, the following preferences are honored by the system:
  Appearance (e.g., color, contrast, size, fonts, layout, displaying text-vs-images)
  Input devices (e.g., keyboard, mouse, pen, voice, natural language, Morse Code)
  Output modalities (e.g., visual, audio, haptic, print, olfactory)
  UI complexity and use of a universal type-in line
  WYSIWYG (what-you-see-is-what-you-get) mode
  Timing (e.g., timeout periods, flash rates, double click speed)
  Multimedia settings (e.g., animation, video, audio, closed captioning, audio description)
  Experience level (e.g., with the system as a whole and with each particular application)

In the example, a new user preferences wizard can employ simple questions and construct decision trees to build a user profile containing the relevant user preferences. The user preferences wizard can be launched at first boot of a device to collect the relevant preferences. The user profile can be stored on removable storage so that it can travel with the user across devices and around the world. Some user preferences can be dependent on the device (e.g., keyboard preferences are generally irrelevant for a kiosk). When new system options or device capabilities are detected, the user can be asked additional questions so that their profile can be updated. Analysis of the user's input patterns (e.g., typing speed and mouse movement) can allow the system to suggest changes that could improve user productivity.

In the example, a system can provide mechanisms to transform GUI output into alternative formats (e.g., speech or Braille). Smart notifications can respect the user context (e.g., when running a Microsoft PowerPoint presentation, instant messaging popups will not be displayed). Multimedia content can contain multiple sub-streams (e.g., closed captions or descriptive audio). Skinning can allow customized views of an application that are optimized for a specific audience.

Example 12

Exemplary Devices that can Detect Changes in the User's Surroundings and System that can Respond Appropriately In the example, ACE-compliant hardware can incorporate sensors to detect changes in the user's surroundings and send that information to the system so that it can make any necessary adjustments to the user experience. For example, if the user is listening to audio and the ambient noise level increases, the system can automatically increase the volume of the audio playback. When the ambient noise reaches a specific threshold, the system can switch to the preferred "no audio" mode, which could be closed captions.

In the example, new sensors can detect changes in the user's immediate surroundings. Examples of such sensors are as follows:
  Photocells that can measure incident light striking the display
  Microphones that can measure ambient noise levels
  GPS that can determine the user's current location
  Gyroscopes that can detect movement
  Galvanic skin response strips that can sense anxiety/state changes
  Cameras that can do proximity detection and enable face recognition In the example, built-in voice chips can announce problems during boot sequence so that blind users can troubleshoot their system, and the device can feed environmental information to the system. Additionally, the system can use environmental data to decide when to intelligently switch between I/O modes (e.g., enter "No Audio" mode when background noise reaches a specific threshold), and self-maintaining devices can communicate with the system to detect and resolve problems. Also, a device can broadcast its I/O capabilities to the system so that the system can optimize the user experience.

Example 13

Exemplary Assistive Technologies and Specialized Devices that can Seamlessly Integrate with the System In the example, ATs can use the current focus and context to alter their behavior (e.g., an on-screen keyboard can hide all keys except its numeric keypad when the focus is in a zip code field). Input devices (e.g., keyboard, mouse, pen, voice, natural language, Morse Code, and sip-n-puff headsets) and output devices (e.g., GUI, synthesized speech, print, and Braille) can be supported. GUI information can be transformed into alternative formats (e.g., speech or Braille).

In the example, a new accessibility model can be introduced which offers one-stop-shopping for all UI information. For example, it can insulate AT products from application and OS version dependencies and be fully supported by every Windows application. Also, applications can have integrated support for detecting and utilizing alternative input/output devices.

In the example, AT products can either ship with the system or be added to address the specific needs of individuals, such as people who are blind or have limited vision, people who are deaf or hard of hearing, people with limited dexterity or mobility, and people with a cognitive or learning disability. Also, AT products can be offered as web services that can be installed on-demand for temporary use by roaming users.

Example 14

Exemplary Applications and Devices that can be Easily Built for an ACE

In the example, the ACE can deliver tools, docs, and solid design practices that greatly reduce the development cost and complexity of shipping adaptive software. For example, one simple rule for application developers might be as follows: "Get everything you need from the user profile and do not assume the user is interacting with the system in a particular way." Mainstream design, development, and testing tools can support the new UI platform and offer wizards, tasks, and other productivity aids to help developers support this adaptive environment with minimal cost. In the example, developers do not need to become accessibility experts to build accessible applications. A new automation model can satisfy the requirements of programmatic access to UI information and become the foundation of automated UI testing tools and AT products. Also, tools can simulate changes in the user's profile in order to identify places where an application author has made assumptions instead of using information available in the user profile.

Example 15

Exemplary Assistive Technologies (ATs)

There are numerous system settings and metrics in an operating system (OS). Some of these settings provide purely state information, but many of the settings serve a much broader purpose and can be associated with specific assistive technologies (ATs) to help the end user. The following examples provide a description of many important system settings and metrics related to accessibility. Traditionally, the term AT refers to a third-party application that provides some form of accessibility service. Since the various settings discussed below also help to provide accessibility services to some degree, these settings or classes of settings can also be referred as ATs. To differentiate these ATs from third-party ATs, they are sometimes referred to as OS ATs. In some cases, a combination of two or more settings serves as an AT.

Many of the following examples first identify a particular problem or issue and then describe an exemplary solution based on certain exemplary system settings. As an example for many of the disclosed ATs, an exemplary set of Specific metrics that can be used to solve the problem is specified. Additionally, for many of the disclosed ATs, a user scenario of a user with the identified problem and how exemplary settings may be used to address it is also provided. Some of the various classes of ATs described herein are as follows:
    Exemplary Keyboard Settings
    Exemplary Mouse Settings
    Exemplary Display Settings
    Exemplary Audio-Video Settings
    Exemplary Timing Settings
    Exemplary UI Effects Settings Example 16

Exemplary Keyboard Settings

Example

Making it Easier to Type

Problem:

There are several reasons why some users may need assistance in configuring the way their keyboard works.
    Some users may have limited hand coordination.
    Some may have tremors or other motor conditions that cause them to unintentionally strike the same key more than once.
    Some users may have trouble striking an intended key
    Some users may have slow reaction time that they hold down a key unintentionally long enough to produce unwanted repeated characters.

Solution:

Settings such as the FilterKeys setting in Microsoft Windows can provide a way for users to configure and customize their keyboard repeat rate, acceptance delay, and bounce rate. This can enable users to individualize the delay during which a key is held down before a key-press is accepted (e.g., Slow keys). Such a setting can help customize the delay after a keystroke, during which an additional key-press will not be accepted if it is identical to the previous keystroke (e.g., Bounce keys). This also enables users to customize the minimal amount of time that they can hold a key down after key-press acceptance before key repeat begins (e.g., Repeat keys). Turning on FilterKeys instructs the keyboard to ignore either brief or repeated keystrokes. The keyboard repeat rate, which generally refers to the rate at which a key repeats when held down, can also be adjusted.

Some of the various components that can make up a setting such as FilterKeys can be exposed independently as follows:
    Help me avoid repeating keystrokes (e.g., Repeat Keys)
    Hold key down for specified period before recognizing keystroke (e.g., Slow Keys)
    Help slow down keyboard repeat rates (e.g., Bounce keys)

Specific Metrics that can be Used to Address this Issue:
    SPI_SETFILTERKEYS
    SPI_SETKEYBOARDDELAY
    SPI_SETKEYBOARDSPEED User Scenario:

Bradley is a safety manager for a transportation company. At the age of 55, he has developed tremors in his hands that cause him to unintentionally strike the same key multiple times. This was a big problem for Bradley, until he used the FilterKeys option in Microsoft Windows. He has configured his computer to ignore keystrokes repeated faster than 1.5 second. The computer now discards unintentional keystrokes caused by his tremors. He has also used the Slow keys feature and configured that keys should be held for at least half a second to be recognized. This has made his experience with the computer better and a lot less painful.

Example

Making it Easier to Use Multiple Key Strokes

Problem:

Users with physical impairments often find it hard to press multiple keys simultaneously.

Solution:

Settings such as the StickyKeys setting in Microsoft Windows can provide a way for users to enter key combinations by pressing one key at a time. This setting can enable the modifier keys to lock or latch so that the multiple key combinations and key+mouse button combinations can be entered sequentially.

Specific Metrics that can be Used to Address this Issue:
SPI_SETSTICKYKEYS

User Scenario 1:

Jacob is a sales manager for a software firm. Five years ago, he was in an auto accident that resulted in him losing his left hand. Being an old-timer from the Unix world, he is most comfortable with using the keyboard. While he has become accustomed to using just his right hand while typing, entering multiple keys combinations still poses a hard problem for Jacob. He has turned on StickyKeys for entering multiple key combinations, and this proved to be a great accommodation technique to help Jacob. Without the StickyKeys option, life would have been even more difficult for Jacob.

User Scenario 2:

Tanya does not have a disability but is trying to log onto her computer while holding a squirmy kid. She is trying to push Ctrl+Alt+Del but is not able to hold down more than 2 keys at a time. A tool can detect this keyboard input and bring up a dialog box asking if she wants StickyKeys turned on.

Example

Making it Easier to Find Out when Keys with Toggle States are Pressed

Problem:

Users who are unable to see the keyboard status lights to determine the current state of a binary-state keyboard toggle control such as 'Caps Lock' or 'Num Lock' often need alternate ways to get this information.

Solution:

Settings such as the ToggleKeys setting in Microsoft Windows can allow users who are unable to see the keyboard status of keys such as 'Caps Lock' determine the state using sound. When this setting is turned on, the system can indicate a locked state with an up-tone and an unlocked state with a down-tone.

Specific Metrics that can be Used to Address this Issue:
SPI_SETTOGGLEKEYS

User Scenario:

Karen is a supervisor in a customer service department. She is blind. She uses a screen reader and a Braille device to help perform her job. She uses the ToggleKeys option to determine the state of the 'Caps Lock' and 'Num Lock' keys in her keyboard. The tone that is played by her system helps her determine the whether the keys are locked or not.

Example

Making it Easier to Identify Keyboard Shortcuts and Access Keys

Problem:

Keyboard shortcuts and access keys are not always obvious. Providing some kind of visual cues can make it easier for users to identify the keyboard shortcuts and access keys.

Solution:

Underlining access keys and providing explicit keyboard shortcut for menu items can make them easily discoverable. Turning on keyboard preference, menu underlines, and keyboard cues flags can provide visual cues making it easier for a user to identify the keyboard shortcuts. Oftentimes, applications (e.g., Microsoft Office) have the visual cues on by default, irrespective of the state of these flags.

Specific Metrics that can be Used to Address this Issue:
SPI_SETKEYBOARDCUES
SPI_SETKEYBOARDPREF
SPI_SETMENUUNDERLINES User Scenario:

Steve is a computer programmer in a small software firm. He has low vision and generally relies on the keyboard to accomplish most of his tasks. He has turned on the "Display keyboard cues" setting so that all the keyboard shortcuts and access keys are visible by default. This makes it much easier for him to work with the keyboard.

Example

Controlling the Mouse Cursor Using the Keyboard

Problem:

Users with restricted limb/hand movement or coordination often find it very hard to use the mouse.

Solution:

Settings such as the MouseKeys setting in Microsoft Windows can provide users with a keyboard alternative to standard pointing devices that enables keyboard control of pointer movement and pointer button functions. This can enable the user to use the numeric keypad to control the mouse pointer to click, double-click, drag, and drop. Toggling the 'Num Lock' can toggle the numeric pad between mouse control mode and normal operation. Turning on the 'snap-to-default button' feature can automatically reposition the mouse cursor to the default buttons in dialogs when the dialogs open, thereby reducing the need to move the mouse over to the default button in the UI. This option can be very helpful in reducing the movement of the mouse cursor and would work well in tandem with the MouseKeys feature.

Specific Metrics that can be Used to Address this Issue:
SPI_SETMOUSEKEYS
SPI_SETSNAPTODEFBUTTON User Scenario:

Jerry is a computer programmer. He recently had an accident and, due to his hand surgery, he has lost the use of his right hand temporarily. Being a right-hander, Jerry finds it extremely difficult to use the mouse with his left hand. Where possible, he uses the keyboard equivalents but, unfortunately, there are still applications that use the mouse extensively. He has turned on the MouseKeys option and is currently using the numeric keypad to control the mouse and do other mouse related activities. He has also enabled the 'Snap to default button' feature where the mouse automatically moves to the default button in an app. All this helps Jerry to still be able to use the mouse despite the temporary loss of use of his right hand.

Example 17

Exemplary Mouse Settings

Example

Making it Easier to Use My Mouse

Problem:
Users with limited hand/limb coordination, tremors, or other motor conditions, and users who use the mouse with their feet often have trouble using the mouse by unintentionally pressing a mouse key more than once or even having problems with pressing the mouse button at all.

Solution:
Settings such as the FilterKeys setting for keyboards but for configuring the way the mouse works could greatly benefit these users. For example, the Mouse Filter Buttons option can provide a way for users to configure and customize the mouse repeat rate and acceptance delay. This can facilitate a pre-determined delay after a button-press, during which an additional mouse button-press will not be accepted. This setting can also enable users to customize the minimal amount of time they need to hold a mouse button down for mouse-press acceptance. Turning on FilterKeys can instruct the keyboard to ignore either brief or repeated keystrokes. The keyboard repeat rate, which is generally the rate at which a key repeats when held down, can also be adjusted.

Specific Metrics that can be Used to Address this Issue:
SPI_SETMOUSEFILTER
SPI_SETCLICKOFFTHEMOUSE
Used in tandem with the other settings (e.g., double click sensitivity and drag sensitivity), SPI_SETMOUSEFILTER could enhance a user's experience with the mouse.

In many cases, small movements needed to click a mouse can be painful to certain users. SPI_SETCLICKOFFTHEMOUSE would move the click away from the mouse. For example, predetermined (or user configurable) keys on the keyboard may be used to represent a click. Then the user just has to move the mouse over the required position and instead of clicking the mouse would press the special key on the keyboard. This could also be used for other mouse operations (e.g., double click, drag, and drop).

User Scenario:
Julia is a claims representative in an insurance company. At the age of 55, she often has difficulties with tremors on her fingers. It is difficult for her to click the mouse button only once and often her single clicks are recognized as double clicks. She can hold the mouse button down successfully by maintaining pressure. After implementation of the disclosed technology, however, Julia seldom has this problem anymore. For example, she may have enabled the mouse filter button option to avoid accidental repeated button clicks. Now the system can prevent her accidental clicks from being recognized as valid mouse clicks. She may also have configured the minimum amount of time needed to hold the mouse button down for it to be recognized as a valid mouse click. This can help her in avoiding accidental mouse clicks as she moves the mouse around, greatly improving her user experience and productivity.

Example

Controlling the Mouse Cursor Using the Keyboard

Discussed above in Example 16 (Keyboard Settings).

Example

Making it Easier to See My Mouse Cursor

Problem:
Users with low vision often find it hard to see where the mouse cursor is on the desktop when the cursor is not moving. Another potential issue is keeping track of the mouse cursor when in motion. Also, the size of the mouse cursor, the shape of it, and the content on the desktop can all make it harder to see.

Solution:
Increasing the size of the mouse cursor can be very helpful in addressing this issue. Features such as the Mouse Sonar feature can cause concentric circles to be drawn around the mouse cursor when the CTRL key is pressed. This can bring a user's attention to the location of the mouse cursor. This can often help when the mouse is currently not being used and the user wants to find where the mouse cursor is. Features such as the Mouse Vanish feature can hide the cursor when in typing mode. Disabling such a feature can ensure that the mouse cursor is always displayed. Features such as the Mouse Trails feature can provide a visual indication as to where the cursor is when it is in motion.

Specific Metrics that can be Used to Address this Issue:
SPI_SETMOUSESONAR
SPI_SETMOUSETRAILS
SPI_SETMOUSEVANISH
SM_CXCURSOR
SM_SYCURSOR
SPI_SETRESETMOUSELOCATION
SPI_SETPROPORTIONALMOUSE
Implementing SPI_SETRESETMOUSELOCATION can result in the resetting of the mouse, by the pressing of a key combination, to a pre-determined position (e.g., the center of the desktop) on a white background that fades out once the mouse is moved. This can provide a user with the ability to press a key combination to move the mouse to a known location. The white background can provide sufficient contrast regardless of the background contents at that position.

Due to the varied content in a typical desktop and the different mouse cursor shapes, if the mouse cursor grew as it moved (until it reached a pre-determined maximum size), SPI_SETPROPORTIONALMOUSE could provide an easy way for a user to visually identify the mouse cursor when in motion. For example, the cursor can shrink again when it rests.

User Scenario:
Ian is a sales clerk at a department store. The computer terminal at the sales counter runs an application that is heavily mouse-driven. Due to his low vision, Ian has a hard time seeing where the mouse is. This affects his ability to do his job and sometimes frustrates his customers. The IT department recently configured his PC using the disclosed technology and set up a profile for Ian to help him with his low vision. Ian now has mouse trails and mouse sonar turned on to help him easily identify where the mouse cursor is, and the snap to default button has also helped. These days he has much happier customers due to his faster response time at the sales desk.

Example

Making it Easier to Hover My Mouse Over Objects

Problem:
Users with restricted limb/hand movement or coordination and hand tremors often find it very hard to hover the mouse cursor over objects.

Solution:
For a hover to be detected, the mouse cursor must remain within a small region for the specified hover time. Increasing the hover-region and/or reducing the hover-time could help ease this. Providing an easy to use a UI that allows users to customize the hover metrics could solve this issue for the users.

Specific Metrics that can be Used to Address this Issue:
SPI_SETMOUSEHOVERHEIGHT
SPI_SETMOUSEHOVERTIME
SPI_SETMOUSEHOVERWIDTH User Scenario:
Monica is a secretary in a law firm. She has been doing this for almost 40 years, but with age come illnesses and impairments. She has turned on the "Single-click to open an item (point to select)" feature in Windows Explorer since clicking the mouse causes pain in her finger joints. But pointing (hovering) has not been easy for Monica, either. The items are rather small and, with her tremors, she was finding it hard to hold the mouse over an object. She has now implemented the disclosed technology to customize the hover metrics, and her user experience is much better and her productivity has gone up tremendously.

Example

Making it Easier to Double Click My Mouse

Problem:
Users with restricted limb/hand movement or coordination often find it very hard to use the mouse.

Solution:
For a double-click to happen, the mouse button should be pressed twice, with a certain maximum time between clicks, and should be within the double click rectangle. Increasing the rectangle and the time between the clicks enables users with hand/limb impairments to double click the mouse more easily.

Specific Metrics that can be Used to Address this Issue:
SPI_SETDOUBLECLICKTIME
SPI_SETDOUBLECLICKHEIGHT
SPI_SETDOUBLECLICKWIDTH User Scenario:
John is a DBA in a small firm. Because he has severe arthritis, and making quick successive finger movements to double-click the mouse is very painful, he has configured and set the double-click time to the slowest setting possible. John has also specified to allow for a larger double-click area, which internally increases the double-click height and width metrics. This gives him more time between the clicks and more room to complete the double-click operation, and these settings make double-clicking much less painful for John.

Example

Making it Easier to Move My Mouse

Problem:
Users with restricted limb/hand movement and users with limited motor skills often find it hard to move the mouse. The mouse either moves too fast for them or is too slow, and is physically painful.

Solution:
Providing users with the facility to adjust the speed and acceleration of the mouse cursor can give them more control over the mouse operations and enhances their user experience.

Specific Metrics that can be Used to Address this Issue:
SPI_SETMOUSESPEED
SPI_SETMOUSE User Scenario:
George is a computer programmer. He lost his hands in a train accident several years ago. He uses a sip-and-puff device to control the mouse. He has adjusted the speed and acceleration settings of the mouse cursor so that he can effectively control the mouse cursor with this external device, which has been very useful to George.

Example

Making it Easier to Use My Mouse with Both Hands

Problem:
The mouse is basically designed for a right-handed user. Users who are left-handed or users with RSI on their right hand, who temporarily switch hands to use the mouse, often find it very hard to use the mouse.

Solution:
Being able to switch the functions of the two mouse buttons can provide left-handed users with a more natural feel. Many mouse devices are available that are symmetrical in shape and facilitate easy switching between the hands. A feature providing the ability to swap buttons easily can provide a good experience to users.

Specific Metrics that can be Used to Address this Issue:
SPI_SETMOUSEBUTTONSWAP
Alternatively, an extension of the SPI_SETMOUSEBUTTONSWAP feature could be to allow the thumb button to left click, as the thumb is often easier to use than the index finger.

User Scenario:
Nicole has been an executive assistant now for over 20 years. Over the years, due to extended periods of keyboard and mouse usage, she has repetitive strain injury that causes great discomfort to her. She now uses voice recognition in place of most of her typing. Her right hand has been more affected because she uses the keyboard and the mouse with her right hand. Recently following the advice of her therapist, she has switched the mouse to her left hand, and the button swap feature has made the change a breeze.

Example

Making it Easier to Drag and Drop using My Mouse

Problem:
Users with restricted limb/hand movement and hand tremors often find it very hard to do a lot of activities with the mouse. Drag and drop is a relatively complex activity that can be quite painful for people with motor disabilities. Conversely, if the drag and drop rectangle metrics are too small, then the smallest mouse movements and mouse clicks could cause accidental drag operations. Another aspect of the drag and drop is that the mouse button must be held down while an object is dragged. This can also be hard for users with impairments in their hand/limb.

Solution:
Drag sensitivity can specify how far (in terms of pixels) the mouse must move with the button held down before the system recognizes that an object is being dragged. Decreasing this value can help in increasing drag sensitivity so that dragging will be easier. Increasing this value prevents accidental dragging when objects are clicked. Providing a UI for users to customize this setting could greatly enhance their computing experience. Dragging an object requires that the mouse button to be held down. Since this is a problem for some users, the 'click-lock' feature can come in very handy. With this feature on, the user can begin a drag operation and, within a user-specified time, the mouse 'locks' itself into a drag operation. Clicking the mouse button again releases the lock and drops the object. This can prevent the mouse button from being held down during dragging.
  Specific metrics that can be used to address this issue:
  SPI_SETDRAGHEIGHT
  SPI_SETDRAGWIDTH
  SPI_SETMOUSECLICKLOCK
  SPI_SETMOUSECLICKLOCKTIME User Scenario:
Rachel is a graphics designer. Her work is very mouse-intense and, recently, she's been having some pain in her fingers. The pain intensifies if she keeps clicking the mouse buttons too rapidly or even holds the mouse button down for relatively long periods of time. Recently, she has used the disclosed technology to configure her personal settings. The disclosed technology intelligently first asked her questions and deduced that she had some trouble using her fingers too intensively and then made it easier for her to drag and drop objects. This has reduced the stress on her fingers and increased her productivity.

Example

Making it Easier to Switch between Windows

Problem:
To switch between windows, users often need to click on a window to bring it to the foreground and thus make it the active window. Users with restricted limb/hand movement or those using external assistive technology devices to control the mouse often find it relatively hard to do this.

Solution:
Providing users with a way to activate and switch between windows by just moving the mouse over the windows can make it easier for such users to perform such operation.

Specific Metrics that can be Used to Address this Issue:
  SPI_SETACTIVEWINDOWTRACKING
  SPI_SETACTIVEWNDTRKZORDER
  SPI_SETACTIVEWNDTRKTIMEOUT User Scenario:
Randy is the department head in a software firm. A few years ago, he had an auto accident that resulted in him becoming a quadriplegic. He uses a sip-and-puff device to navigate the mouse pointer across the desktop. Randy has enabled the 'Make it easier to switch between windows' option. Now he just has to move the mouse pointer over the right window and it automatically comes to the foreground and gets activated. This has greatly enhanced his user experience and is less demanding to Randy.

Example

Miscellaneous Mouse Settings

A SPI_SETWHEELSCROLLLINES setting can determine the number of lines of text to scroll when the mouse wheel is turned.
A SEELINE demo can add a horizontal line to the tail of the mouse. Such a feature can help users to read text more easily.

Example 18

Exemplary Display Settings

Example

Making it Easier to See Objects on the Screen by Adjusting Color and Contrast

Problem:
Users with visual impairments (e.g., low vision, and color blindness) often find it hard to easily make out items on the desktop. This could be due to various reasons such as insufficient contrast between foreground and background elements, using sub-optimal color combinations such as red-green that affect users with color blindness, and using window elements and text that are too small.

Solution:
Providing users with a simple way to control colors and increase contrast, and providing a way to just swap problem colors could go a very long way in addressing these problems.

Specific Metrics that can be Used to Address this Issue:
  SPI_SETHIGHCONTRAST
  SPI_SETCONTRAST
  SPI_SETREPLACECOLOR
  SPI_SETHUEANDSATURATION
  The SPI_SETHIGHCONTRAST flag can perform many functions, some of which are as follows:
  Change the foreground and background colors
  Increase the font size
  Increase the size of certain controls (e.g., scroll bars and icons)
  Remove any background images

Example

Making it Easier to see Objects on the Screen by Removing Overlapped Content Problem:

Users with low vision often find it hard to easily make out items on the desktop. The cause for this problem can be a wide array of features that exist in the operating system today, such as background images, textured backgrounds, water marks on documents, alpha-blending and transparency, etc. All of these things can reduce the contrast between the foreground and the background, thereby making it hard for some users to see objects on the screen.

Solution:

A single global flag that can be used to universally turn on or off unimportant overlapped content in the system could help users with low vision. Documents that have watermarks that convey important information such as "Confidential" could also be turned off, as this does not need to be the only place or means to convey such information. For example, headers and footers in documents may be used to convey such important information.

Specific Metrics that can be Used to Address this Issue:
  SPI_SETDISABLEOVERLAPPEDCONTENT
  SPI_SETDISABLEUNWANTEDBACKGROUNDIMAGES User Scenario:

Brad has been visually impaired since the age of 10, due to glaucoma, but that has not prevented him from becoming a computer programmer. Brad can view and interact with the computer with the help of his screen magnifier, but he also requires high contrast to be able to efficiently work on the computer. While he appreciates the technological advance of the disclosed technology and the new look and feel, rich features such as overlapped content, transparency and background images, and textured backgrounds can serve as a hindrance to Brad. Brad is very impressed with the disclosed technology, however, because it can provide great customizability to turn off all features that hinder him and provide the high contrast that he desires. For example, he has made use of the "Disable Overlapped Contents" flag. He has enabled this flag and has thus simplified his UI. There is no more overlap of content. The background does not have any more images. The transparencies are turned off. Now the UI on his computer is simple and provides the right amount of contrast for him to work effectively. Brad thinks the disclosed technology is cool because it provides him a way to turn off all the "cool" features.

Example

Making it Easier to see Objects on the Screen by Removing Gradients

Problem:

Users with low vision often find it hard to easily make out items on the desktop. The presence of gradients can reduce contrast between the foreground and the background, thereby affecting readability and making it hard for these users to see the objects on the screen clearly. Gradients may be considered to be part of overlapped content. The presence of unwanted background images and gradients can reduce the contrast between the foreground and background, thereby reducing readability. Also, gradients are often dependent on themes while background images can be turned off by the application.

Solution:

A single global flag that can be used to universally turn on or off all gradients in the system can help users with low vision.

Specific Metrics that can be Used to Address this Issue:
  SPI_SETDISABLEGRADIENTS
  SPI_SETGRADIENTCAPTIONS User Scenario:

Taylor is 13 years old. He has very low vision. He needs very high contrast between foreground and background images to distinguish things on the computer. He likes the rich and polished features of the disclosed technology, but gradients in buttons, captions, and other places in the system make it really hard for him to read the text, despite using a screen magnifier. Thus, he has turned on the "Disable Gradient" flag. This setting has smartly turned off all gradients in the system and the plain background helps him see and read the text better. He has stored all of his settings in his PUP device and he uses the setting in school and also the public library.

Example

Making it Easier to Distinguish Focused Elements

Problem:

Users with low vision often find it hard to distinguish window elements that have the keyboard focus. The focus rectangle is generally a single pixel rectangle and that can make it hard to see. The width of the text insertion point is also related to this. Since it is generally very thin, it is hard for users with low vision to easily see this.

Solution:

Providing a way for users to increase border thickness can enable them to see focused elements more easily. Settings such as the SPI_SETFOCUSBORDERHEIGHT setting can be used to set the height of the top and bottom edges of the focus rectangle. Settings such as the SPI_SETFOCUSBORDERWIDTH setting can be used to set the width of the left and right edges of the focus rectangle. Settings such as the SPI_SETCARETWIDTH setting can be used to configure a desired width of the caret. Another way to make it easier to distinguish focused elements can be to ensure that the right color combination is used in Shell themes to separate elements with keyboard focus from other elements in the window.

Specific Metrics that can be Used to Address this Issue:
  SPI_SETFOCUSBORDERHEIGHT
  SPI_SETFOCUSBORDERWIDTH
  SPI_SETCARETWIDTH User Scenario:

Marge is in the sales department of a pharmaceutical company. Part of her job is to enter sales details of a large variety of drugs in her spreadsheet. She needs to be sure that the right information is always being entered against the right drug. Due to her low vision, she often has trouble finding the focused element. She has used the disclosed technology to make it easier for her to distinguish focused elements. Now the focused elements are surrounded by a thicker focus rectangle and a wider caret, thereby making it easier for Marge to accomplish her job.

Example

Making it Easier to Read Text (e.g., Fonts) on the Computer

Problem:

Users with low vision often find it hard to distinguish certain text and fonts in the computer.

Solution:

Providing users with the ability to customize and specify font and font attributes that is easy for them to read is very important. Once a user selects a particular font and style, this setting can be applied throughout the system to replace all of the fonts in the system. A user can use the disclosed technology to specify an appropriate font and its attributes. The disclosed technology thus automatically sets the font and attributes to several UI elements such as icon fonts, caption fonts, menu fonts, and status and message fonts using metrics such as SPI_SETICONTITLELOGFONT and SPI_SETNONCIENTMETRICS. The disclosed technology can provide the necessary support to modify the font attributes of applications using flow layout.

Specific Metrics that can be Used to Address this Issue:
    SPI_SETFONTATTRIBUTES User Scenario:

Scott is a designer in a printing company. He designs a great variety of things from visiting cards to letter heads to invitations, but Scott has low vision. He often finds it easy to read some fonts, but other fonts give him a hard time—especially the script fonts. Until using the disclosed technology, he had to rely on his magnifier to enlarge contents to a really large size. Now, he has customized the Font Attributes to change the various font attributes (e.g., font type, weight, and italics) of all the text that would appear across the operating system. He promptly changed the script fonts to Arial with standard weight which gives him better reading speed. Now his what-you-see-is-what-you-get (WYSIWYG) applications respect the new font styles flag and display his fonts in Arial, thereby making it much easier for him to read.

Example

Making Things on the Screen Bigger

Problem:

Users with low vision and users with restricted hand/limb movements often find it hard to see and use controls that are too small. In many instances in the desktop, there are small fonts that cannot be easily made bigger, and this can give such users a bad user experience Solution:

Providing a way for users to make such things bigger on the screen could enable them to more easily see and use controls that are small. By scaling the desktop or individual windows, the issue of layout can be resolved. This can enable fonts to be made large enough to suit the needs of the customers.

Specific Metrics that can be Used to Address this Issue:
    SPI_SETACTIVESCALEFACTOR User Scenario:

Jon has been in the software field for over 25 years. Over the years his eye sight has steadily deteriorated. Though he wears glasses, he would still like things to be a little bigger. He uses extra large fonts in his system, but there are places where the settings are not respected. Sometimes the layout is affected because he needs to use larger fonts. Using the disclosed technology, he has enabled the Active Window Scale Factor flag. He is now able to linearly scale application windows to bigger sizes. He has customized the settings to scale the active window to be 150% of the original size. Now his active window is always as big as he likes it. When he switches to another application/window, the previous window resumes its original size and the new active window gets scaled up. Jon likes this, because it avoids the clutter of having all his windows magnified and it is now very easy for him to say which window has the keyboard focus.

Example

Making it Easier to Interact with Controls that are too Small

Problem:

Users with low vision and users with restricted hand/limb movements often find it hard to use small controls. Using controls in applications such as Microsoft Windows Media Player skins, or even resizing the windows, are hard because of the very small size of the controls.

Solution:

One solution to address this problem is to provide a way to understand the minimum size the user can interact with and then try to make sure all the controls that are drawn are at least as big as the minimum size that is convenient to the user. Now the user does not have to specify or change the sizes in multiple places and can enjoy a consistent user experience. Using the disclosed technology, users can be provided with a UI that allows them to click on a bulls-eye-like control. Based on the users' ability to click on small area and their accuracy, the minimum area that they can interact with (e.g., SPI_SETMINIMUMHITREGION) can be calculated. The disclosed technology can then automatically set minimum values to non-client elements using a flag such as the SPI_SETNONCLIENTMETRICS, SPI_SETBORDERWIDTH flag. Control developers can monitor this flag, which can automatically change the sizes of controls that do not affect the layout of the application. Application developers can monitor this flag and ensure that the flag is respected and that all controls are resized to be at least the minimum size usable by the user. This setting can also affect the icon sizes and the mouse cursor size.

Specific Metrics that can be Used to Address this Issue:
    SPI_SETMIMMUMHITREGION
    SPI_SETBORDER
    SPI_SETNONCLIENTMETRICS
    SPI_SETICONMETRICS User Scenario:

Henry is a sip-and-puff device user. Because of his paralysis, he is unable to use his hands. He controls the mouse cursor by moving his head. Window elements that are too small to use pose a big challenge to Henry. He needs to really focus to be able to resize a window or manipulate small controls. He has used the disclosed technology to specify the minimum size necessary for a control to be so that he can comfortably use it. Now most of his applications have resized their controls to be big enough for him to use. Window borders are wider, the buttons on the caption bar are bigger, and even the controls in his favorite Microsoft Windows Media Player skin are large enough for him to work with. And the best part in his eyes was that all he had to do was click on a bulls-eye control as close to the middle as possible.

Example 19

Exemplary Audio-Video Settings

Example

Providing a Visual Alternate to Sound

Problem:

There are many instances where a sound is played to indicate that important things are happening in the computer. Users who are hard of hearing or deaf often cannot hear these sounds and need alternative visual ways for the sound to be indicated.

Solution:

When a sound is played, providing a visual indication such as flashing the caption bar of the active window, the active window itself, or the whole desktop can enable users with hearing difficulties to know that something important has happened in their computer.

Specific Metrics that can be Used to Address this Issue:
SPI_SETSOUNDSENTRY

For application-specific changes, some alerts such as a dialog popping up, IRC window updates, or a beeping/flashing window title bar can be implemented. For notifications (e.g., friends logging on to instant messaging, emails, etc.), a Notification Manager can be implemented. For spoken narration (e.g., a video clip or an introduction to an application the first time it's opened), captions can be implemented. For music (e.g., WMAs and 3D game ambient sounds), visuals may not be needed.

User Scenario:

Jessie has been deaf since birth. She is currently a test engineer in a software company. These days all kinds of applications use sound to prompt users of something important happening on the computer. Using the disclosed technology, she has turned on the SPI_SETSHOWSOUNDNOTIFICATIONS flag and has configured the caption bar of her active window to flash whenever a sound is played. She thus uses that to monitor all audio prompts on her machine.

Example

Providing Audio Description to Video

Problem:

Users who are visually impaired often cannot see video and need alternative ways to get that information.

Solution:

While it is possible for the visually impaired to hear audio and assimilate a lot of information, there is a lot of action going on in video that might not have corresponding audio. In such cases, a specific audio description of what is happening in the video could help such users a great deal in understanding the overall message of the video better.

Specific Metrics that can be Used to Address this Issue:
SPI_SETAUDIODESCRIPTION User Scenario:

Bianca is a teacher who has very low vision. She uses a lot of multimedia in her class to teach her students. A lot of content came with closed captioning and audio description built in. Bianca always has her audio descriptions turned on so that she has a full understanding of what is happening and so that she can answer any questions her students ask. Bianca has come to rely upon audio description as it provides her with an alternative without which she would not be able to do her job.

Example

Providing Closed Captioning to Audio

Problem:

Users who are hard of hearing or deaf often cannot hear sounds and audio in streaming media and need alternative ways to get that information.

Solution:

Closed captioning can be one solution for users who have sight but no hearing (or are hard of hearing) to get information from and understand the content of streaming audio or video. When a video and/or audio is played, closed captions can provide a guide as to what is being said in the media.

Specific Metrics that can be Used to Address this Issue:
SPI_SETSHOWSOUNDS

User Scenario:

Kramer works in a manufacturing plant. He has lost 80% of his hearing since an accident 8 months ago. A large part of his job is to see various training sessions from other plants and partners and to document the process. Since his accident, Kramer relies 100% on closed captioning to get the information from the training videos. The closed captions provide the best possible alternative for Kramer without which he would not be able to do his job.

Example 20

Exemplary Timing Settings

Example

Making it Easy to Control the Rate of UI Flashing

Problem:

Periodic automatic refreshing, flashing, blinking, flickering, and moving of content can all be causes for epileptic seizures. Users with photosensitive epilepsy need a way to control flashing so that the rate at which the UI flashes does not adversely affect them.

Solution:

Providing a flag that globally controls the rate of flashing UI in the system can help certain users to avoid an unpleasant experience. Settings such as SetCaretBlinkTime( ) and GetCaretBlinkTime( ) can be used to set the rate of caret flash. Alternatively, a global flag such as SPI_SETUIFLASHRATE can be used to set the ideal rate of flashing of all UI in the system, including the caret. This could provide users with a single consistent user experience across the OS.

Specific Metrics that can be Used to Address this Issue:
SPI_SETUIFLASHRATE

User Scenario:

Jordon is a teacher with photosensitive epilepsy. Automatic refreshing, flashing, blinking, etc., at a particular rate can cause serious seizures. The various educational software that Jordon uses in school has a variety of animations with UI flashing at various speeds. Using the disclosed technology, he is able to set the UI flash rate of his computer to a value of 0.5 times a second. This can alter the flash/refresh rate of applications running in his computer to 0.5 times a second. Such consistency across the OS can prevent any adverse experience he might suffer due to seizures.

Example

Making it Easy to Control the Duration of UI Notifications

Problem:

There are various kinds of notifications that can pop up in the system. Users with cognitive impairments such as ADHD and Dyslexia may need a longer time to read text in the notifications.

Solution:

Providing a flag that globally controls the duration of the notification 'toasts' can give certain users more control and better enable them to read the content of the notification pop-ups. Using a global flag such as SPI_SETMESSAGE-DURATION, users can set the duration that is most comfortable to their personal needs. This flag can be used by all applications across the OS to provide an excellent user experience to the end-user with these cognitive disorders.

Specific Metrics that can be Used to Address this Issue:
SPI_SETMESSAGEDURATION

User Scenario:

Sandra is a sophomore at college. She is dyslexic. Over the years she has improved her learning and reading skills, but she still takes a little longer to read than most people. She uses her computer for all of her educational and social activities. One of her biggest problems was that notification toasts disappeared faster than she could read them. She could hover the mouse over the toast to make them linger longer, but it was easier to read them without having to move the mouse over the toast each time. Using the disclosed technology, she has configured her system to have notification durations at the maximum allowable setting (e.g., 16 seconds). This has thus provided her with ample time to read the text in a notification.

Example 21

Exemplary UI Effects Settings

Example

Making it Easy to Turn ON/OFF Animations

Problem:

Periodic automatic refreshing, flashing, blinking, flickering, and moving of content (e.g., animations and other transformations) can all be causes for epileptic seizures. Users with photosensitive epilepsy may need a way to turn off all such flashing and animation.

Solution:

A single global flag that can be used to universally turn on or off all animations, transformations, and other transitions in the system can help users with photosensitive epilepsy. Based on a user's choice to turn on or off animations, a flag such as the SPI_SETDISABLEANIMATIONS flag can set a variety of several other flags to on or off, thereby providing the user with a single consistent user experience across the OS.

Specific Metrics that can be Used to Address this Issue:
SPI_SETDISABLEANIMATIONS
SPI_SETUIEFFECTS
SPI_SETCOMBOBOXANIMATION
SPI_SETLISTBOXSMOOTHSCROLLING
SPI_SETSELECTIONFADE
SPI_SETTOOLTIPANIMATION
SPI_SETTOOLTEPFADE
SPI_SETANIMATIONS User Scenario:

Frank is a supervisor in a large department store. Frank has photosensitive epilepsy. Periodic automatic refreshing, flashing, blinking, flickering, and moving of content are all causes for seizure for Frank. The sales application that he uses to enter customer sales transactions has been specially modified so that its caret does not blink at all, but there are other applications and animations that can affect Frank. In some cases, he can not even use certain applications. Using the disclosed technology, he has enabled the 'Disable Animations' flag in his computer. Through the use of this flag, he is able to stop all flashing and automatic refreshing. He is also able to turn off all animations on his machine. Since the enabling of this flag, all of the applications in his system respect the new setting. Now Frank is able to fully use his system without it adversely affecting him anymore.

Example 22

Exemplary Settings that Help Third-Party ATs

Example

Determining what Assistive Technology is Running

Problem:

Applications may need a way to determine what ATs are running on the system.

Solution:

Some applications may change their default behavior and turn on special accessibility features or an alternative behavior when ATs are running. Based on what AT is running on the system at that time, an application can provide certain special services to help a user in need of some kind of accommodation.

Specific Metrics that can be Used to Address this Issue:
SPI_SETASSISTIVETECHNOLOGY
SPI_SETSCREENREADER
Using the above settings, bits such as the following can be turned on or off:
Screen Reader
Screen Magnification
Input Emulation
User Assist User Scenario:

Apex Systems has just released its new version of ApexEdit 2.0. This product is an editing tool that handles anything from .txt files to .doc files. The programmers at Apex have introduced a new feature that outputs text to an output device. When a flag such as the SPI_SETASSISTIVETECHNOLOGY flag is set with the Screen Reader bit on, the application automatically converts all of the content to text and directs it to an output device. ApexEdit 2.0 supports many vector-based fonts, and this feature easily filters the raw text content, thereby increasing performance and enhancing the experience for a user.

Example

Making it Easy to Turn Off Off-Screen Buffering

Problem:
Currently, there is no simple way to turn off off-screen buffering.

Solution:
When off-screen buffering is turned on, an AT may need to do many extra operations, which greatly reduces performance. In cases where this is not required or when the application in play provides all the necessary information, having off-screen buffering may not provide any additional value and, in fact, only serve to hinder a user's experience.

Specific Metrics that can be Used to Address this Issue:
SPI_SETDISABLEOFFSCREENBUFFERING Example 23

Exemplary Miscellaneous Settings

Example

Turning Off All Accessibility Options

Problem:
Users who do not need any accessibility settings, but accidentally turn them on, may need a way to turn them off.

Solution:
Providing a simple way to turn off accessibility settings can help users who don't need such settings, thereby enhancing their user experience.

Specific Metrics that can be Used to Address this Issue:
SPI_SETDISABLEACCESSIBILITYOPTIONS User Scenario:
Tom is an avid gamer who is annoyed when the FilterKeys setting gets triggered automatically. He can go into the FilterKeys settings to turn it off, but he'd much rather have an option right on the FilterKeys dialog to turn off such accessibility settings. Since he started using the disclosed technology, he has not had this problem. During his initial system customization, he had an option to turn off all accessibility options. Now Tom's efforts to get high-scores in his games are not hindered by needless accessibility dialogs.

Example 24

Exemplary Enumeration of Settings

The following represent an enumeration of exemplary parameters for keyboard settings:
SPI_GETFILTERKEYS
SPI_SETFILTERKEYS
SPI_GETSTICKYKEYS
SPI_SETSTICKYKEYS
SPI_GETTOGGLEKEYS
SPI_SETTOGGLEKEYS
SPI_GETMOUSEKEYS
SPI_SETMOUSEKEYS The following represent an enumeration of exemplary parameters for mouse settings:
SPI_GETMOUSECLICKLOCK
SPI_SETMOUSECLICKLOCK
SPI_GETMOUSECLICKLOCKTIME
SPI_SETMOUSECLICKLOCKTIME
SPI_GETMOUSESONAR
SPI_SETMOUSESONAR
SPI_GETMOUSEVANISH
SPI_SETMOUSEVANISH
SPI_GETMOUSEFILTER
SPI_SETMOUSEFILTER The following represent an enumeration of exemplary parameters for administrative settings:
SPI_GETACCESSTIMEOUT
SPI_SETACCESSTIMEOUT The following represent an enumeration of exemplary parameters for display settings:
SPI_GETHIGHCONTRAST
SPI_SETHIGHCONTRAST
SPI_GETFOCUSBORDERHEIGHT
SPI_SETFOCUSBORDERHEIGHT
SPI_GETFOCUSBORDERWIDTH
SPI_SETFOCUSBORDERWIDTH
SPI_GETCONTRAST
SPI_SETCONTRAST
SPI_GETREPLACECOLOR
SPI_SETREPLACECOLOR
SPI_GETHUEANDSATURATION
SPI_SETHUEANDSATURATION
SPI_GETMINIMUMHITREGION
SPI_SETMINIMUMHITREGION
SPI_GETACTIVESCALEFACTOR
SPI_SETACTIVESCALEFACTOR
SPI_GETFONTATTRIBUTES
SPI_SETFONTATTRIBUTES
SPI_GETDISABLEANIMATIONS
SPI_SETDISABLEANIMATIONS
SPI_GETDISABLEGRADIENTS
SPI_SETDISABLEGRADIENTS
SPI_GETDISABLEOVERLAPPEDCONTENT
SPI_SETDISABLEOVERLAPPEDCONTENT The following represent an enumeration of exemplary parameters for AT settings:
SPI_GETSCREENREADER
SPI_SETSCREENREADER
SPI_GETSERIALKEYS
SPI_SETSERIALKEYS
SPI_GETASSISTIVETECHNOLOGY
SPI_SETASSISTIVETECHNOLOGY The following represent an enumeration of exemplary parameters for audio settings:
SPI_GETSHOWSOUNDS
SPI_SETSHOWSOUNDS
SPI_GETSOUNDSENTRY
SPI_SETSOUNDSENTRY
SPI_GETCAPTIONS
SPI_SETCAPTIONS
SPI_GETAUDIODESCRIPTIONS
SPI_SETAUDIODESCRIPTIONS
SPI_GETSOUNDNOTIFICATIONS SPI_SETSOUNDNOTIFICATIONS
The following represent an enumeration of exemplary parameters for icon settings:
SPI_GETICONMETRICS
SPI_SETICONMETRICS
SPI_GETICONTITLEWRAP
SPI_ICONHORIZONTALSPACING
SPI_ICONVERTICALSPACING
SPI_GETICONTITLELOGFONT
SPI_SETICONS
SPI_SETICONTITLELOGFONT
SPI_SETICONTITLEWRAP
The following represent an enumeration of exemplary parameters for input settings:
SPI_GETBEEP
SPI_SETBEEP
SPI_GETBLOCKSENDINPUTREQUESTS
SPI_SETBLOCKSENDINPUTREQUESTS
SPI_GETDEFAULTINPUTLANG
SPI_SETDEFAULTINPUTLANG
SPI_GETKEYBOARDCUES
SPI_SETKEYBOARDCUES
SPI_GETKEYBOARDDELAY
SPI_SETKEYBOARDDELAY
SPI_GETKEYBOARDPREF
SPI_SETKEYBOARDPREF
SPI_GETKEYBOARDSPEED
SPI_SETKEYBOARDSPEED
SPI_GETMOUSE
SPI_SETMOUSE
SPI_GETMOUSEOVERHEIGHT
SPI_SETMOUSEOVERHEIGHT
SPI_GETMOUSEOVERTIME
SPI_SETMOUSEOVERTIME
SPI_GETMOUSEOVERWIDTH
SPI_SETMOUSEOVERWIDTH
SPI_GETMOUSESPEED
SPI_SETMOUSESPEED
SPI_GETMOUSETRAILS
SPI_SETMOUSETRAILS
SPI_GETSNAPTODEFBUTTON
SPI_SETSNAPTODEFBUTTON
SPI_GETWHEELSCROLLLINES
SPI_SETWHEELSCROLLLINES
SPI_SETDOUBLECLICKTIME
SPI_SETDOUBLECLKHEIGHT
SPI_SETDOUBLECLKWIDTH
SPI_SETLANGTOGGLE
SPI_SETMOUSEBUTTONSWAP
The following represent an enumeration of exemplary parameters for menu settings:
SPI_GETMENUDROPALIGNMENT
SPI_SETMENUDROPALIGNMENT
SPI_GETMENUSHOWDELAY
SPI_SETMENUSHOWDELAY
SPI_GETMENUFADE
SPI_SETMENUFADE
The following represent an enumeration of exemplary parameters for UI effects settings:
SPI_GETCOMBOBOXANIMATION
SPI_SETCOMBOBOXANIMATION
SPI_GETCURSORSHADOW
SPI_SETCURSORSHADOW
SPI_GETGRADIENTCAPTIONS
SPI_SETGRADIENTCAPTIONS
SPI_GETHOTTRACKING
SPI_SETHOTTRACKING
SPI_GETLISTBOXSMOOTHSCROLLING
SPI_SETLISTBOXSMOOTHSCROLLING
SPI_GETMENUANIMATION
SPI_SETMENUANIMATION
SPI_GETMENUUNDERLINES
SPI_SETMENUUNDERLINES
SPI_GETSELECTIONFADE
SPI_SETSELECTIONFADE
SPI_GETTOOLTIPANIMATION
SPI_SETTOOLTIPANIMATION
SPI_GETTOOLTIPFADE
SPI_SETTOOLTIPFADE
SPI_GETUIEFFECTS
SPI_SETUIEFFECTS
The following represent an enumeration of exemplary parameters for window settings:
SPI_GETACTFVEWINDOWTRACKING
SPI_SETACTIVEWINDOWTRACKING
SPI_GETACTIVEWNDTRKZORDER
SPI_SETACTIVEWNDTRKZORDER
SPI_GETACTIVEWNDTRKTIMEOUT
SPI_SETACTIVEWNDTRKTIMEOUT
SPI_GETANIMATION
SPI_SETANIMATION
SPI_GETBORDER
SPI_SETBORDER
SPI_GETCARETWIDTH
SPI_SETCARETWIDTH
SPI_GETDRAGFULLWINDOWS
SPI_SETDRAGFULLWINDOWS
SPI_GETFOREGROUNDFLASHCOUNT
SPI_SETFOREGROUNDFLASHCOUNT
SPI_GETFOREGROUNDLOCKTIMEOUT
SPI_SETFOREGROUNDLOCKTIMEOUT
SPI_GETMINIMIZEDMETRICS
SPI_SETMINIMIZEDMETRICS
SPI_GETNONCLIENTMETRICS
SPI_SETNONCLIENTMETRICS
SPI_GETSHOWIMEUI
SPI_SETSHOWIMEUI
SPI_SETDRAGHEIGHT
SPI_SETDRAGWIDTH
SPI_GETMINIMUMHITREGION
SPI_SETMINIMUMHITREGION Example 25

Exemplary Computing Environment

Figure 5:
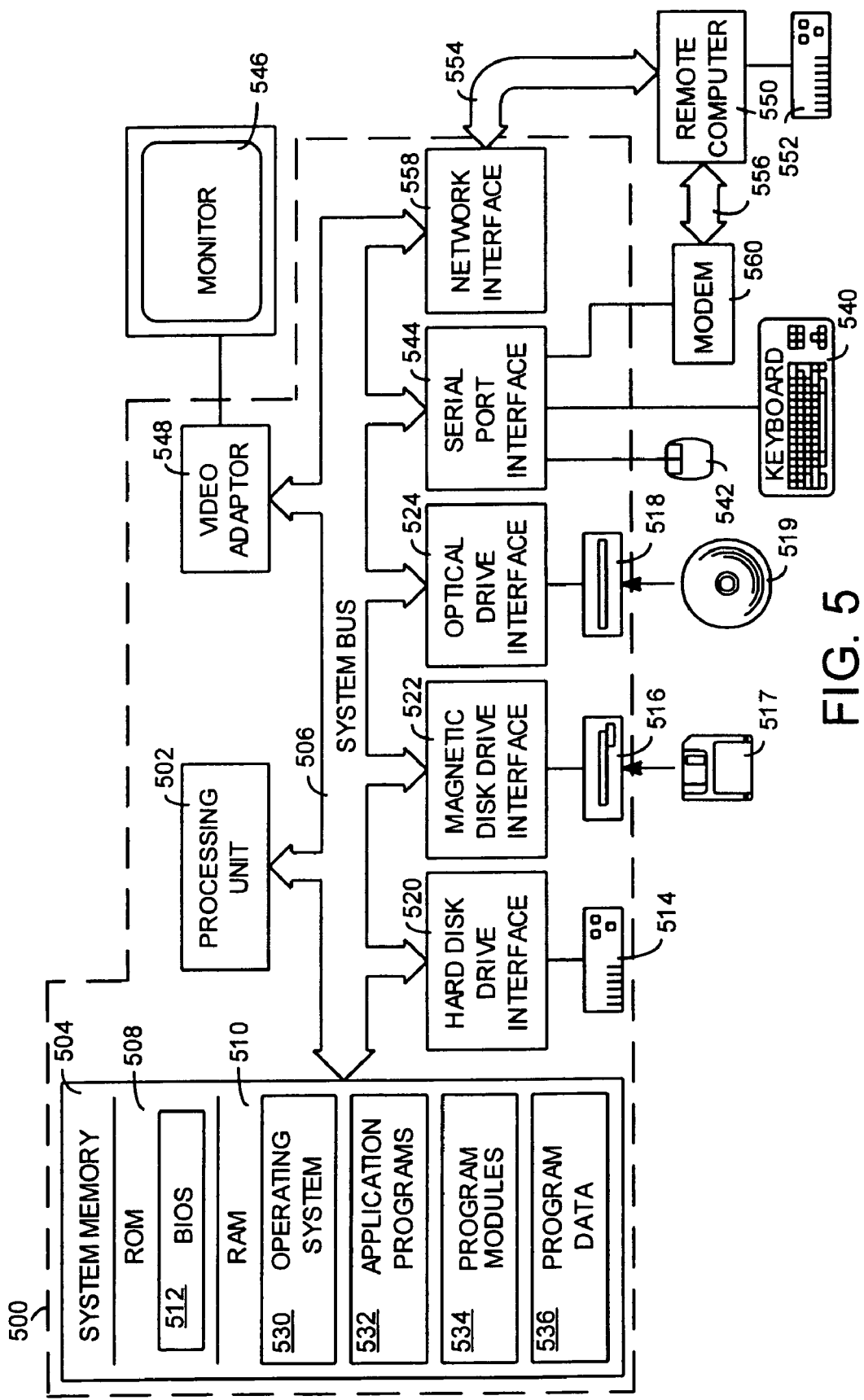
FIG. 5 is a diagram depicting a general-purpose computing device constituting an exemplary system for implementing the disclosed technology.

FIG. 5 and the following discussion are intended to provide a brief, general description of an exemplary computing environment in which the disclosed technology may be implemented. Although not required, the disclosed technology will be described in the general context of computer-executable instructions, such as program modules, being executed by a personal computer (PC). Generally, program modules include routines, programs, objects, components, data structures, etc. that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

FIG. 5 shows an exemplary system for implementing the disclosed technology that includes a general purpose computing device in the form of a conventional PC 500, which includes a processing unit 502, a system memory 504, and a system bus 506 that couples various system components including the system memory 504 to the processing unit 502. The system bus 506 may be any of several types of bus structures including a memory bus or memory controller, a peripheral bus, and a local bus using any of a variety of bus architectures. The system memory 504 includes read only memory (ROM) 508 and random access memory (RAM) 510. A basic input/output system (BIOS) 512, containing the basic routines that help with the transfer of information between elements within the PC 500, is stored in ROM 508.

The PC 500 further includes a hard disk drive 514 for reading from and writing to a hard disk (not shown), a magnetic disk drive 516 for reading from or writing to a removable magnetic disk 517, and an optical disk drive 518 for reading from or writing to a removable optical disk 519 (such as a CD-ROM or other optical media). The hard disk drive 514, magnetic disk drive 516, and optical disk drive 518 are connected to the system bus 506 by a hard disk drive interface 520, a magnetic disk drive interface 522, and an optical drive interface 524, respectively. The drives and their associated computer-readable media provide nonvolatile storage of computer-readable instructions, data structures, program modules, and other data for the PC 500. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored on the hard disk, magnetic disk 517, optical disk 519, ROM 508, or RAM 510, including an operating system 530, one or more application programs 532, other program modules 534, and program data 536. A user may enter commands and information into the PC 500 through input devices such as a keyboard 540 and pointing device 542 (such as a mouse). Other input devices (not shown) may include a digital camera, microphone, joystick, game pad, satellite dish, scanner, or the like. These and other input devices are often connected to the processing unit 502 through a serial port interface 544 that is coupled to the system bus 506, but may be connected by other interfaces such as a parallel port, game port, or universal serial bus (USB). A monitor 546 or other type of display device is also connected to the system bus 506 via an interface, such as a video adapter 548. Other peripheral output devices, such as speakers and printers (not shown), may be included.

The PC 500 may operate in a networked environment using logical connections to one or more remote computers, such as a remote computer 550. The remote computer 550 may be another PC, a server, a router, a network PC, or a peer device or other common network node, and typically includes many or all of the elements described above relative to the PC 500, although only a memory storage device 552 has been illustrated in FIG. 5. The logical connections depicted in FIG. 5 include a local area network (LAN) 554 and a wide area network (WAN) 556. Such networking environments are commonplace in offices, enterprise-wide computer networks, intranets, and the Internet.

When used in a LAN networking environment, the PC 500 is connected to the LAN 554 through a network interface 558. When used in a WAN networking environment, the PC 500 typically includes a modem 560 or other means for establishing communications over the WAN 556, such as the Internet.

The modem 560, which may be internal or external, is connected to the system bus 506 via the serial port interface 544. In a networked environment, program modules depicted relative to the personal computer 500, or portions thereof, may be stored in the remote memory storage device. The network connections shown are exemplary, and other means of establishing a communications link between the computers may be used.

Alternatives

The technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. Rather, the scope of the invention includes what is covered by the following claims. We therefore claim as our invention all that comes within the scope and spirit of these claims.

We claim:

1. A computer-implemented method for personalizing user accessibility options, comprising:
    monitoring interaction of a computer user with at least one electronic device, wherein the at least one electronic device is electronically coupled with a computer system, wherein the monitoring is performed by the computer system, and wherein the monitoring comprises monitoring selection of larger fonts in multiple applications or documents;
    inferring that the computer user is having difficulty viewing a screen by way of the monitoring selection of larger fonts in multiple applications or documents, wherein the inferring is performed by the computer system; and
    configuring at least one system-wide accessibility setting comprising a font size setting, wherein the configuring is performed by the computer system based on having inferred that the computer user is having difficulty viewing the screen, and whereby font size on the screen is automatically increased.

2. The method of claim 1, wherein configuring the at least one accessibility setting comprises adjusting visual settings.

3. The method of claim 2, wherein adjusting visual settings comprises changing at least one setting from the group consisting of resolution, color, font weight, cursor size, cursor blink rate, animation settings, transparency, and alarm notifications.

4. The method of claim 1, wherein configuring the at least one accessibility setting comprises adjusting audio settings.

5. The method of claim 4, wherein adjusting audio settings comprises changing at least one setting from the group consisting of volume, sound schemes, Text-to-Speech (TTS) settings, captions, and text equivalents for audio notifications.

6. The method of claim 1, wherein configuring the at least one accessibility setting comprises adjusting input settings.

7. The method of claim 6, wherein adjusting input settings comprises changing at least one setting from the group consisting of typing assistance, specialized input devices, pointer assistance, input hints, and timeout intervals.

8. The method of claim 1, wherein configuring the at least one accessibility setting comprises adjusting cognitive settings.

9. The method of claim 1, wherein the monitoring comprises actively detecting at least one accessibility issue that arose during the interaction.

10. The method of claim 9, wherein the configuring comprises presenting to the user at least one recommendation regarding an accessibility setting that can be changed to address the at least one accessibility issue that arose during the interaction.

11. The method for personalizing user accessibility options of claim 1, wherein the monitoring comprises monitoring the use of magnification mechanisms by the user in applications executed on or in documents being viewed by the electronic device.

12. One or more computer-readable media having computer-executable instructions for performing a method for personalizing user accessibility options, comprising:

monitoring interaction of a computer user with at least one electronic device, wherein the at least one electronic device is electronically coupled with a computer system, wherein the monitoring is performed by the computer system, and wherein the monitoring comprises monitoring selection of larger fonts in multiple applications or documents;

inferring that the computer user is having difficulty viewing a screen by way of the monitoring selection of larger fonts in multiple applications or documents, wherein the inferring is performed by the computer system; and configuring at least one system-wide accessibility setting comprising a font size setting, wherein the configuring is performed by the computer system based on having inferred that the computer user is having difficulty viewing the screen, and whereby font size on the screen is automatically increased.

13. An adaptive computing environment, comprising:
a computer system with which a user interacts, wherein the computer system comprises a screen;
a monitoring service that tracks user behavior during interaction of the user with the computer system, wherein the monitoring service is configured to monitor larger font size selections in a plurality of applications or documents to infer that the user is having difficulty viewing the screen, and wherein the monitoring service executes on the computer system; and
a personalization wizard executing on the computer system, wherein the personalization wizard configures at least one system-wide accessibility setting of the computer system comprising a font size setting based on information from the monitoring service indicating that the user is having difficulty viewing the screen, whereby font size on the screen is automatically increased.

14. The adaptive computing environment of claim 13, wherein the personalization wizard notifies the user that the at least one system-wide accessibility setting can be changed based on the information from the monitoring service.

15. The adaptive computing environment of claim 13, further comprising a user profile, wherein the user profile is based at least in part on the information from the monitoring service.

16. The adaptive computing environment of claim 15, wherein the user profile can be modified by the computer system, modified by the user, saved to a file, and transported inside and outside of the computer system.

17. The adaptive computing environment of claim 13, wherein the monitoring service is configured to monitor use of magnification mechanisms.

* * * * *